US 8,297,395 B2

(12) United States Patent
Yamada et al.

(10) Patent No.: US 8,297,395 B2
(45) Date of Patent: Oct. 30, 2012

(54) SCOOTER-TYPE VEHICLE

(75) Inventors: Hiroshi Yamada, Wako (JP); Mitsuru Terada, Wako (JP); Tsubasa Ishii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 12/875,631

(22) Filed: Sep. 3, 2010

(65) Prior Publication Data
US 2011/0073396 A1 Mar. 31, 2011

(30) Foreign Application Priority Data
Sep. 30, 2009 (JP) ................................. 2009-228825

(51) Int. Cl.
*B62K 11/10* (2006.01)
(52) U.S. Cl. ....................................... 180/219; 280/835
(58) Field of Classification Search .................. 180/219; 280/833–835
See application file for complete search history.

(56) References Cited

U.S. PATENT DOCUMENTS

| | | | | |
|---|---|---|---|---|
| 4,305,416 A | * | 12/1981 | Henning et al. ................ 137/38 |
| 6,644,693 B2 | * | 11/2003 | Michisaka et al. ............ 280/835 |
| 7,198,129 B2 | * | 4/2007 | Sakaki et al. .................. 180/219 |
| 7,717,466 B2 | * | 5/2010 | Asamura et al. .............. 280/835 |
| 7,857,351 B2 | * | 12/2010 | Edwards ......................... 280/834 |
| 2007/0089922 A1 | * | 4/2007 | Iwasaki ......................... 180/219 |
| 2008/0011743 A1 | * | 1/2008 | Edwards ...................... 220/4.14 |
| 2010/0059024 A1 | * | 3/2010 | Yamada et al. ............... 123/495 |

FOREIGN PATENT DOCUMENTS

JP 2002-206466 A 7/2002

* cited by examiner

*Primary Examiner* — Lesley D Morris
*Assistant Examiner* — Michael Stabley
(74) *Attorney, Agent, or Firm* — Westerman, Hattori, Daniels & Adrian, LLP

(57) ABSTRACT

A scooter-type vehicle can freely set a capacity of a fuel filter without being restricted by swing of a unit-swing type engine. A fuel supply device includes a fuel tank and a fuel supply passage for supplying fuel to an engine. A pump-anterior filter for purifying the fuel in the fuel tank, a fuel pump, a fuel filter disposed on the downstream side of the fuel pump, and an injector for injecting fuel are arranged on the fuel supply passage in this order. The fuel filter is disposed between the upper surface of the fuel tank and the step floor. The size of the fuel filter can freely be set without being restricted by swing of the engine located rearward of the fuel tank.

18 Claims, 15 Drawing Sheets

SCOOTER-TYPE VEHICLE

TECHNICAL FIELD

An improvement of a scooter-type vehicle is disclosed. Specifically, an improvement in arrangement of a fuel filter installed in a scooter-type vehicle is disclosed.

BACKGROUND OF THE INVENTION

There is known a traditional scooter-type vehicle in which a fuel filter is installed at an intermediate portion of a fuel supply passage for supplying the fuel in a fuel tank to a combustion chamber of an engine (see e.g. Japanese Patent Laid-open No. 2002-206466 (FIGS. 1 and 2)).

As illustrated in Japanese Patent Laid-open No. 2002-206466, a scooter-type vehicle includes a unit-swing type engine swingably mounted to a rear frame and a fuel tank disposed below a step floor on which occupant's feet are placed in front of the engine.

As further illustrated in Japanese Patent Laid-open No. 2002-206466, the fuel in the fuel tank passes through a delivery tube and is supplied to a fuel filter for purification. Then, the purified fuel is supplied to the engine via a fuel pump.

As illustrated in Japanese Patent Laid-open No. 2002-206466, the fuel filter is disposed rearward of a fuel tank in the front-to-rear direction of the vehicle and in a space below a cylinder head and a head cover. In this case, the cylinder head and the head cover are also swung up and down along with the swing of the unit-swing type engine. Thus, the cylinder head and the head cover come close to the fuel filter.

To ensure a clearance between fuel filter, and the cylinder head and the head cover encountered when they come close to each other, a method for downsizing the fuel filter may be conceivable. However, if the fuel filter is downsized, a replacement cycle of an element of the fuel filter may be shortened in some cases.

SUMMARY OF THE INVENTION

A scooter-type vehicle is disclosed that can freely set a capacity of a fuel filter without being restricted by swing of a unit-swing type engine.

A first aspect of the disclosure is characterized in that in a scooter-type vehicle includes a body frame; a step floor which is provided between a front wheel and a seat and on which rider's feet is placed; a fuel tank disposed below the step floor and having a filler neck projecting upward from an upper surface thereof; an engine swingably supported in the rear of the fuel tank by the body frame; a fuel supply passage for supplying fuel in the fuel tank toward the engine; and a fuel filter disposed in an intermediate portion of the fuel supply passage and provided to purify the fuel. The fuel filter is disposed between the upper surface of the fuel tank and the step floor.

A second aspect of the disclosure is characterized in that a recessed portion is provided on the upper surface of the fuel tank and at least a portion of the fuel filter is located in the recessed portion, as viewed from above the vehicle.

A third aspect of the disclosure is characterized in that the body frame includes a floor pipe located below the step floor and extending in a front-to-rear direction of the vehicle and the step floor is disposed along the floor pipe, as viewed from the side of the vehicle; and in that the fuel filter is disposed more inwardly of the vehicle than the floor pipe and is detachably attached to the floor pipe in such a manner that a longitudinal direction of the fuel filter runs along an extending direction of the floor pipe.

A fourth aspect of the disclosure is characterized in that the fuel filter is detachably attached to the upper surface of the fuel tank in such a manner that a longitudinal direction of the fuel filter runs along the upper surface of the fuel tank.

A fifth aspect of the disclosure is characterized in that a seat-lower cover is provided in a rear portion of the step floor so as to rise upward from the step floor to cover the seat from below, a fuel fill opening is provided from the step floor to the seat-lower cover to feed fuel to the fuel tank, and a fuel lid is provided at the fuel fill opening so as to be opened and closed when fuel is supplied to the fuel fill opening; and in that the fuel filter is disposed so that at least a portion of the fuel filter is located within the fuel fill opening, as viewed from above the vehicle, and the fuel filter can be attached and detached from the fuel fill opening.

A sixth aspect of the disclosure is characterized in that a pump-anterior filter for purifying fuel in the fuel tank, a fuel pump disposed on the downstream side of the pump-anterior filter, the fuel filter disposed on the downstream side of the fuel pump, and an injector for injecting fuel toward the engine are arranged on the fuel supply passage in this order; in that a pressure regulator for returning fuel to the fuel tank when fuel pressure between the fuel pump and the injector increases and reaches a predetermined pressure is disposed on the downstream side of the fuel filter; and in that the pressure regulator is disposed on the upper surface of the fuel tank in such a manner that at least a portion of the pressure regulator is located in the fuel fill opening, as viewed from above the vehicle, so that the pressure regulator can be attached and detached through the fuel fill opening.

A seventh aspect of the disclosure is characterized in that the fuel filter has finer meshes than those of the pump-anterior filter.

An eighth aspect of the disclosure is characterized in that the fuel filter is disposed at a position lower than the injector in a vertical direction of the vehicle.

In the first aspect, the fuel filter is disposed between the upper surface of the fuel tank and the step floor. Therefore, the size of the fuel filter can freely be set without being restricted by the swing of the engine located rearward of the fuel tank.

Additionally, since the filler neck projecting from the upper surface of the fuel tank exists, the space between the fuel tank upper surface and the step floor tends to become a dead space. However, since the fuel filter is disposed between the upper surface of the fuel tank and the step floor, the dead space defined between the upper surface of the fuel tank and the step floor can effectively be utilized.

In the second aspect, the recessed portion is provided on the upper surface of the fuel tank and at least a portion of the fuel filter is located in the recessed portion, as viewed from above the vehicle. The recessed portion is used to broaden the space that can be used for the arrangement of the fuel filter. Therefore, the large-size fuel filter can be arranged therein.

Additionally, since the fuel filter is housed in the recessed portion of the fuel tank upper surface, the height up to the fuel filter from the ground can be reduced. Consequently, the step floor disposed above the fuel filter can be lowered.

In the third aspect, the fuel filter is disposed more inwardly of the vehicle than the floor pipe and detachably attached to the floor pipe in such a manner that a longitudinal direction of the fuel filter runs along an extending direction of the floor pipe. If the fuel filter is disposed to extend in the vertical direction of the vehicle, the space between the step floor and the floor pipe broadens unsatisfactorily. In this regard, since the step floor can be disposed as close to the floor pipe as possible, the step floor can be lowered.

Additionally, since the fuel filter is located more inwardly of the vehicle than the floor pipe, the fuel filter can externally be protected by the floor pipe.

In the fourth aspect, the fuel filter is detachably attached to the upper surface of the fuel tank. In the state where the fuel filter is temporarily assembled to the upper surface of the fuel tank (in the previously assembled state), these component parts are collectively assembled to the vehicle. Therefore, assembly work can be facilitated on a vehicle assembly line.

Additionally, the fuel filter is attached in such a manner that its longitudinal direction runs along the upper surface of the fuel tank. If the fuel filter is disposed to extend in the vertical direction of the vehicle, the space between the step floor and the fuel tank broadens unsatisfactorily. In this regard, since the step floor can be disposed as close to the fuel tank as possible, the step floor can be lowered.

In the fifth aspect, the size of the fuel fill opening is set and the fuel filter is disposed so that at least a portion of the fuel filter is located in the fuel fill opening. If the fuel lid is opened, at least a portion of the fuel filter is exposed. Therefore, the fuel fill opening can be used to perform the attachment and detachment work for the fuel filter. If the step floor is additionally provided with the fuel fill opening and the lid, the number of component parts is increased. In this regard, the number of component parts is reduced to reduce component costs.

In the sixth aspect, the pressure regulator is disposed on the upper surface of the fuel tank so that at least a portion of the pressure regulator is located within the fuel fill opening. If the fuel lid is opened, at least a portion of the pressure regulator is exposed. Therefore, by using the fuel fill opening, the attachment and detachment work for the pressure regulator can be performed along with the attachment and detachment work for the fuel filter.

In the seventh aspect, the fuel filter has finer meshes than those of the pump-anterior filter. The pump-anterior filter can capture large dust and the fuel filter can capture fine dust that has passed through the pump-anterior filter. Since the fuel filter does not capture large dust, it is hard to be clogged, which can reduce its replacement frequency. Additionally, since the pump-anterior filter has the coarse meshes, it is hard to be clogged. Thus, the pump-anterior filter can be prevented from serving as resistance against the fuel pump, so that the inexpensive fuel pump can be employed.

Consequently, the replacement cycle of both the pump-anterior filter and the fuel filter can be lengthened and the frequency of maintenance can be reduced. In addition, the fuel flow passing through the pump-anterior filter and the fuel filter can satisfactorily be maintained for a long period of time. Even if a necessary fuel flow rate increases suddenly, the pump-anterior filter and the fuel filter can sufficiently deal with such an event.

Since the fuel filter has fine meshes, it can capture fine dust even in the case of using fuel with fine dust such as ethanol. On the other hand, the fuel filter has finer meshes than those of the pump-anterior filter in order to make it possible to use even fuel with fine dust such as ethanol. Therefore, the fuel filter becomes shorter in replacement cycle than the pump-anterior filter. However, the attachment and detachment work for the fuel filter can be done only by opening the fuel lid, which facilitates the replacement work.

In the eighth aspect, the fuel filter is disposed at a position lower than the injector. Therefore, in the case where the vehicle is parked for a long period of time, it is possible to prevent fuel from leaking from the injector due to the weight of the fuel staying in the fuel filter.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
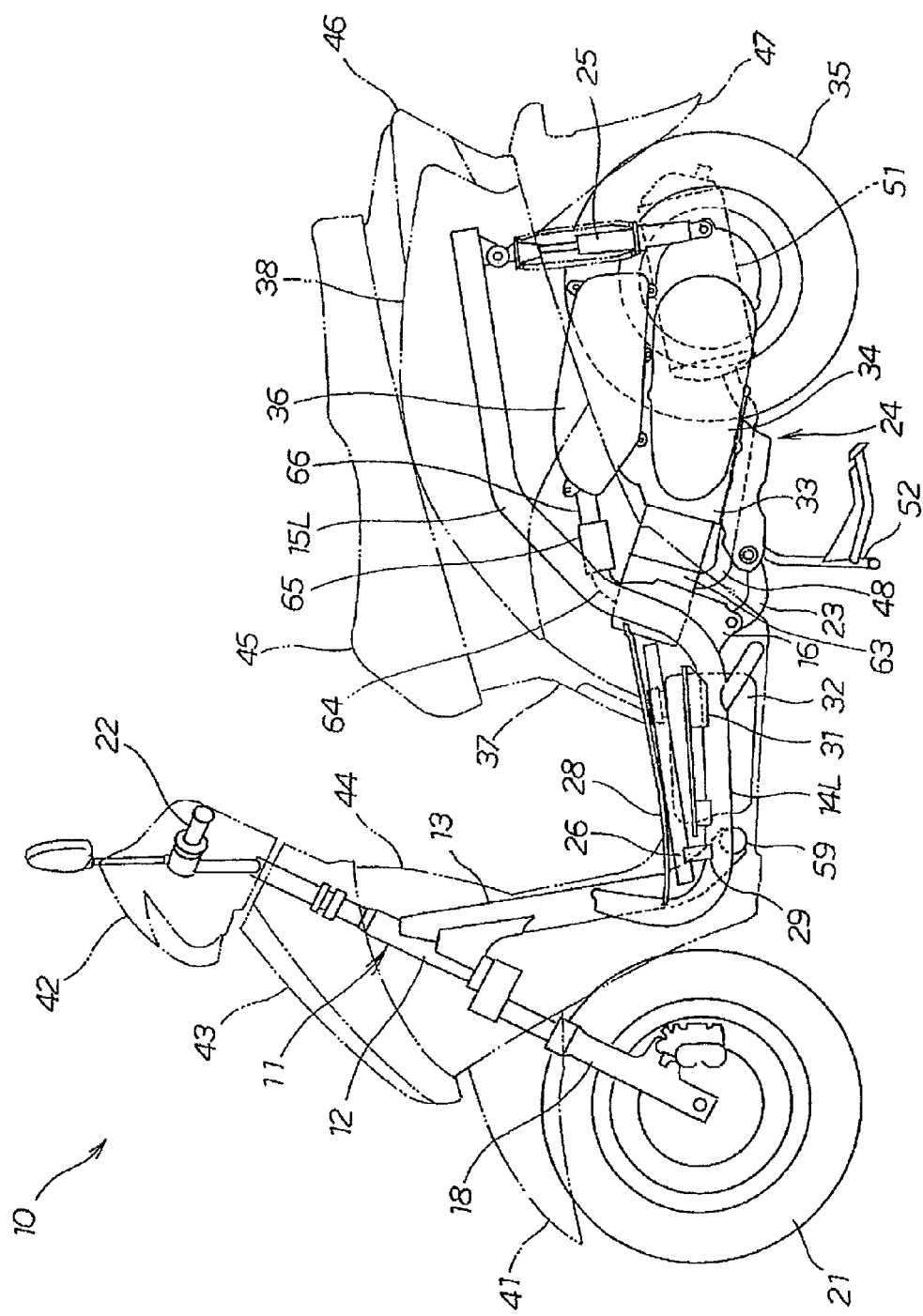
FIG. 1 is a lateral view of a scooter-type vehicle according to a first embodiment.

Embodiments will hereinafter be described with reference to the accompanying drawings. Incidentally, the drawings shall be viewed in the direction of reference numerals. In addition, arrows in the drawings represent the front of a vehicle.

A first embodiment is first described with reference to the drawings.

Referring to FIG. 1, a scooter-type 10 as a motorcycle includes a body frame 11 serving as a framework. The body frame 11 includes a head pipe 12 forming a front end portion; a down frame 13 extending downward from the head pipe 12; and a pair of left and right lower frames 14L and 14R (only reference numeral 14L is illustrated) extending rearward from the lower portion of the down frame 13. The body frame 11 further includes a pair of left and right rear frames 15L and 15R (only reference numeral 15L is illustrated) extending rearward and obliquely upward from corresponding rear portions of the lower frames 14L and 14R; and a pair of left and right link support brackets 16 and 17 (only reference numeral 16 is illustrated) joined to the corresponding respective intermediate portions of the rear frames 15L and 15R.

The head pipe 12 is steerably attached to a front fork 18. A front wheel 21 is attached to a lower end of the front fork 18. A handlebar 22 is attached to an upper end of the head pipe 12.

The scooter-type vehicle 10 is such that a power unit 24 is vertically swingably mounted to the link support brackets 16 and 17 via a link 23. A rear cushion unit 25 is mounted so as to be spanned between the rear end portion of the power unit 24 and the rear end portion of the rear frame 15.

A pair of left and right floor pipes 26 and 27 (only reference numeral 26 is illustrated) is provided above the corresponding lower frames 14L and 14R so as to extend in the front-to-rear direction of the vehicle. A step floor 28 on which operator's feet are placed is disposed above and along the floor pipes 26 and 27. The lower frames 14L and 14R are provided with respective stays 29 supporting the corresponding floor pipes 26 and 27 and with fuel tank support brackets 31 supporting the fuel tank 32.

The power unit 24 is composed of an engine 33 forming a front portion and a continuously variable transmission 34 integrally coupled to a rear portion of the engine 33. A rear wheel 35 is attached to a rear portion of the continuously variable transmission 34.

Incidentally, reference numeral 36 denotes an air cleaner, 37 denotes a seat-lower cover which covers the seat 45 from below, 38 denotes a rear side cover, 41 denotes a front fender, and 42 denotes a handlebar cover. In addition, reference numeral 43 denotes a front cover, 44 denotes a leg shield, 45 denotes a seat, 46 denotes a tail lamp, 47 denotes a rear fender, 48 denotes an exhaust pipe, 51 denotes a muffler and 52 denotes a main stand.

Figure 2:
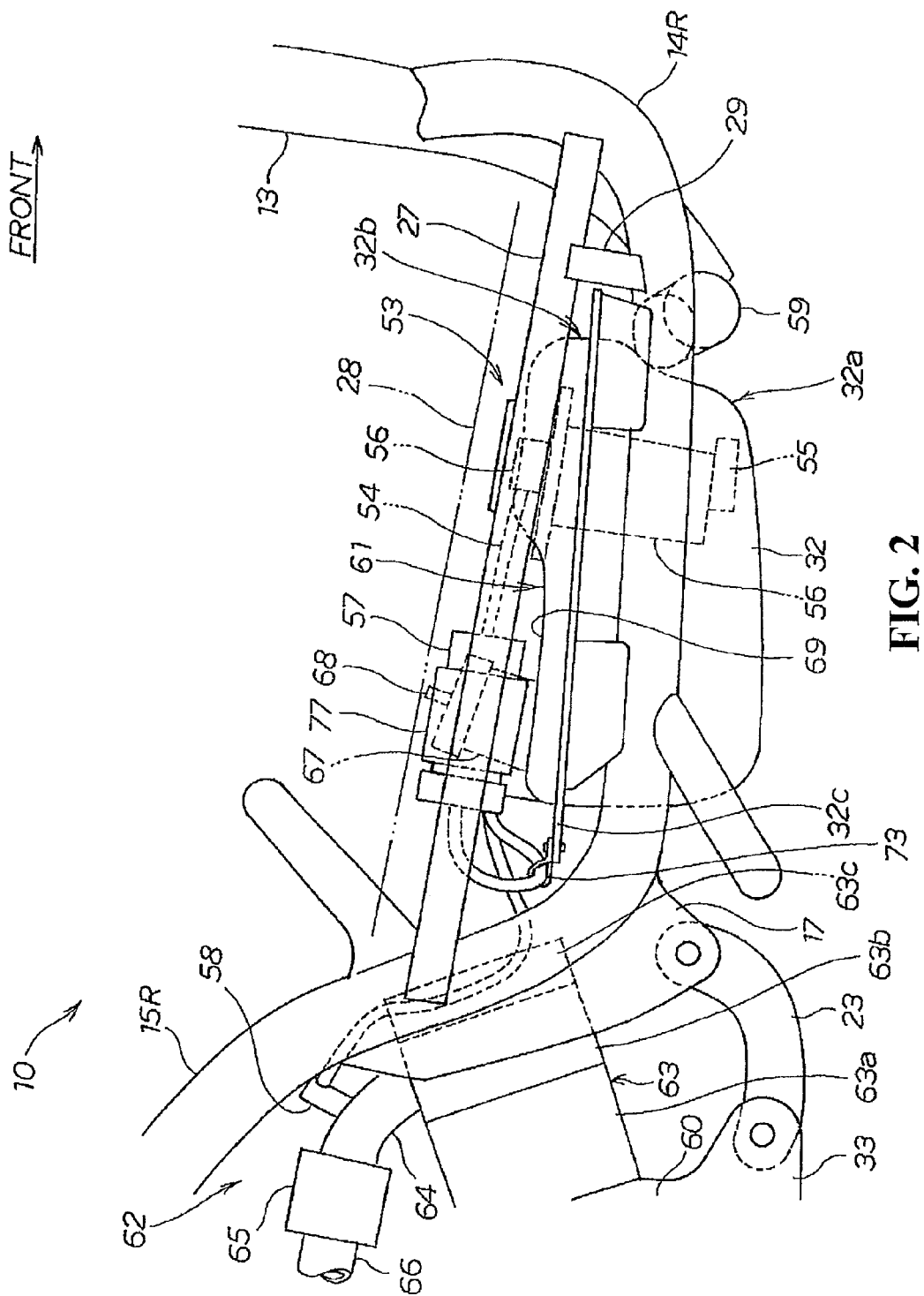
FIG. 2 is a lateral view of a fuel supply device disposed on a body frame.

Referring to FIG. 2, a fuel supply device 53 includes the fuel tank 32 and a fuel supply passage 54 for supplying the fuel in the fuel tank 32 to the engine 33. A pump-anterior filter 55, a fuel pump 56, a fuel filter 57, and an injector 58 are arranged on the fuel supply passage 54 in this order. The pump-anterior filter 55 is provided to purify the fuel in the fuel tank 32. The fuel pump 56 is disposed on the downstream side of the pump-anterior filter 55. The fuel filter 57 is disposed on the downstream side of the fuel pump 56 and has finer meshes than those of the pump-anterior filter 55. The injector 58 is provided to inject fuel toward the engine 33. Incidentally, the pump-anterior filter 55 and the fuel pump 56 are installed in the fuel tank 32 and the injector 58 is mounted to an intake pipe 64.

The fuel tank 32 is a container formed by putting a tank upper-half body 32b protruding upward over a tank lower-half body concaved downward and joining their flange portions 32c together for integration. The tank upper-half body 32b is provided at a rear portion with an upward extending filler neck 67, which is provided with a fuel cap 68. The fuel pump 56 is inserted from above and mounted in the front portion of the tank upper-half body 32b. Incidentally, the pump-anterior filter 55 is attached to the fuel pump 56.

Figure 3:
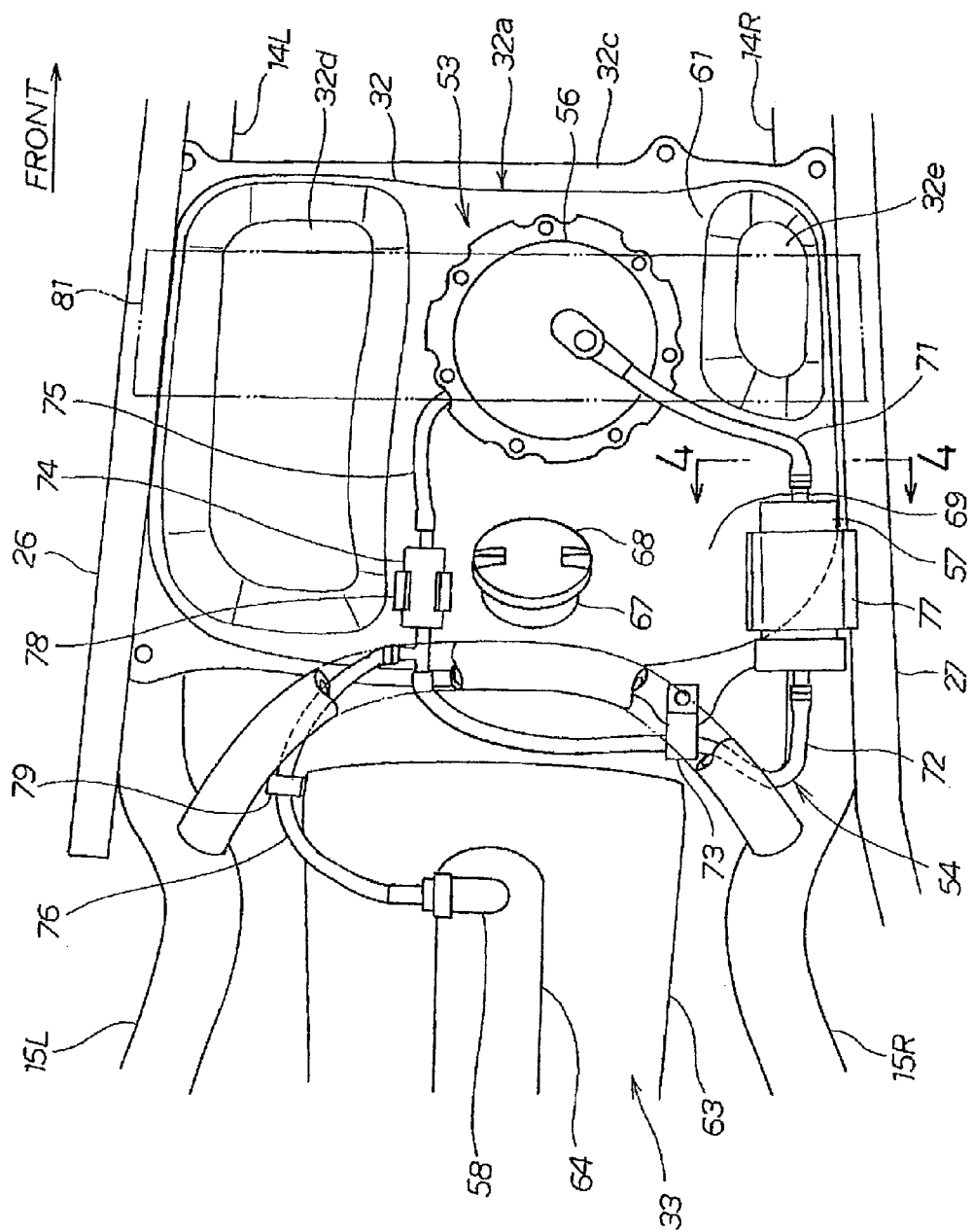
FIG. 3 is a plan view of an essential portion of the scooter-type vehicle.

As illustrated in FIG. 3, the fuel tank 32 is a rectangular tank as viewed from above. The fuel tank 32 is made to have a width equivalent to an inner width between the floor pipe 26 and the floor pipe 27, which increases a capacity.

An upper surface of the fuel tank 32 (the tank upper-half body 32b) is not flat. Specifically, a portion, leftward of the fuel pump 56 and the filler opening 67, of the upper surface 61 of the fuel tank 32 (the tank upper-half body 32b) is formed as an upward protruding portion 32d. In addition, a portion rightward of the fuel pump 56 is formed as an upward protruding portion 32e. The remainder of the upper surface of the fuel tank 32 is formed as a recessed portion 69.

A cross pipe 59 is spanned between the left and right lower frames 14L and 14R (only reference numeral 14R is illustrated). A central portion of the cross pipe 59 is coupled to a lower end of the down frame 13.

The engine 33 includes a crankcase 60 housing a crankshaft (not illustrated) and a cylinder portion 63 protruding from the crankcase 60 toward the front of the vehicle. The cylinder portion 63 is composed of a cylinder block 63a, a cylinder head 63b and a head cover 63c in order from the crankcase 60.

An intake device 62 includes an intake pipe 64 connected to an upper portion of the cylinder head 63b, a throttle body 65 connected to the intake pipe 64, and the air cleaner (reference numeral 36 in FIG. 1) connected to the throttle body 65 via a connecting tube 66.

The injector 58 is attached to the intake pipe 64 to supply fuel toward the engine 33.

Incidentally, the filler neck 67 projects from the upper surface 61 of the fuel tank 32 and the fuel cap 68 is attached to the filler neck 67. The upper surface 61 of the fuel tank 32 is provided with the partially lowering recessed portion 69.

The fuel filter 57 has finer meshes than those of the pump-anterior filter 55. That is, the mesh coarseness of the fuel filter 57 is made different from that of the pump-anterior filter 55. Therefore, even in the case of using fuel with fine dust such as ethanol, the fine dust that has not been captured by the pump-anterior filter 55 can be captured by the fuel filter 57. Thus, fuel such as ethanol or the like can be used.

A description is next given of the arrangement of the fuel filter 57 as viewed from above.

As illustrated in FIG. 2, the fuel filter 57 is disposed between the upper surface 61 of the fuel tank 32 and the step floor 28 and at a position lower than the injector 58 in the vertical direction of the vehicle.

As illustrated in FIG. 3, the fuel filter 57 is attached to the inside of the floor pipe 27 in such a manner that its longitudinal direction runs along the extending direction of the floor pipe 27.

The fuel supply device 53 includes the fuel tank 32, the fuel supply passage 54 and a pressure regulator 74 connected between a fuel pipe 72 and a return pipe 75. The return pipe 75 connects the pressure regulator 74 with the fuel tank 32. Incidentally, the pressure regulator 74 is provided to return part of the fuel to the fuel tank 32 via the return pipe 75 when fuel pressure between the fuel pump 56 and the injector 58 in the fuel supply passage 54 increases and reaches a predetermined pressure.

The fuel supply passage 54 includes a fuel pipe 71 connecting the fuel pump 56 with the fuel filter 57 and fuel pipes 72 and 76 connecting the fuel filter 57 with the injector 58. The fuel pipe 71 has one end connected to the fuel pump 56 and the other end connected to the fuel filter 57. The fuel pipe 72 has one end connected to the fuel filter 57, an intermediate portion held by a pipe clip 73 provided on the flange portion 32c of the fuel tank 32, and the other end connected to the pressure regulator 74 disposed on the upper surface 61 of the fuel tank 32. The fuel pipe 76 has one end connected to an upstream branch side of the pressure regulator 74, an intermediate portion held by a pipe clip 79 provided on the cylinder portion 63, and the other end connected to the injector 58. In this way, the fuel in the fuel tank 32 is supplied from the injector 58 toward the engine 33.

The fuel filter 57 is partially located at the recessed portion 69 of the fuel tank 32.

Incidentally, the fuel filter 57 is held by a filter support clip 77 (detailed later) provided on the floor pipe 27. The pressure regulator 74 is held by a regulator support clip 78 provided on the recessed portion 69 of the fuel tank. Reference numeral 81 denotes a cross plate spanned between the left and right floor pipes 26 and 27.

A description is next given of attachment of the fuel filter 57, the filter support clip 77 and the like.

Figure 4A:
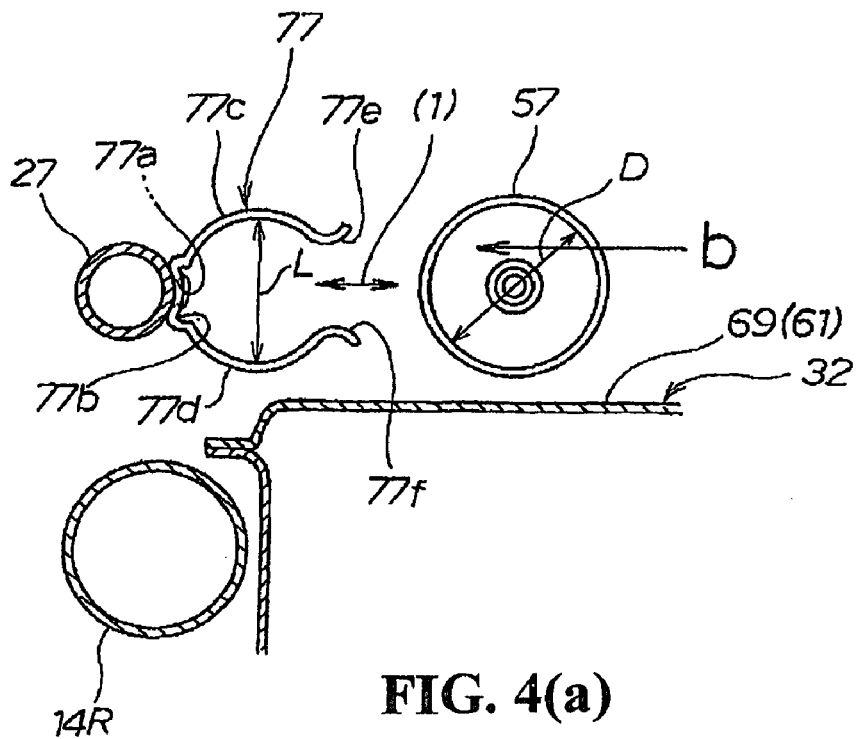
FIG. 4 is a view for assistance in explaining attachment of a fuel filter and a filter support clip.

Referring to FIG. 4(a), the filter support clip 77 attached to the floor pipe 27 is formed of an elastically deformable material in a general C-shape. The filter support clip 77 includes a bottom portion 77b bored with an elongate hole 77a; arm portions 77c, 77d extending from both ends of the bottom portion 77b; and return portions 77e and 77f provided at tips of the arm portions 77c and 77d, respectively.

The fuel filter 57 is formed like a cylinder with a diameter D. The fuel filter 57 is displaced along arrow (1) and pushed into the filter support clip 77. The fuel filter 57 pushes the return portions 77e and 77f and is then displaced to the back, when it is gripped between the arm portions 77c and 77d.

A distance L between the arm portions 77c and 77d is smaller than the diameter D. Therefore, the fuel filter 57 is held by the elastic action of the filter support clip.

The filter support clip 77 is provided on the floor pipe 27 and opens toward the inside of the vehicle. Since the recessed portion 69 of the fuel tank 32 exists in this opening direction, the fuel filter 57 can be displaced with ease.

Incidentally, the regulator support clip (reference numeral 78 in FIG. 3) is also formed of an elastically deformable material in a general C-shape in a similar way.

The regulator support clip (reference numeral 78 in FIG. 3) is provided on the recessed portion 69 of the fuel tank 32 so as to open upward. The pressure regulator (reference numeral 74 in FIG. 3) is attached and detached by being displaced vertically.

Figure 4B:
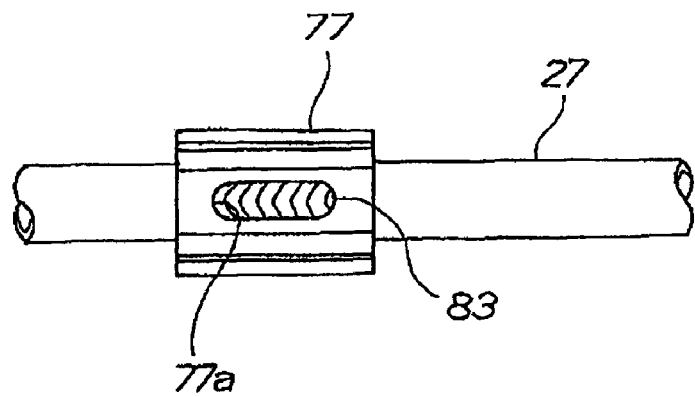

FIG. 4(b) is a view from arrow B in FIG. 4(a). The filter support clip 77 is provided with an elongate hole 77a in the bottom surface. This portion the filter support clip 77 is secured by welding to the floor pipe 27. Reference numeral 83 denotes a welding portion. Incidentally, the regulator support clip 78 is also welded to the recessed portion 69 of the fuel tank 32 in a similar way.

A description is next given of an access hole of the fuel filter 57.

Figure 5:
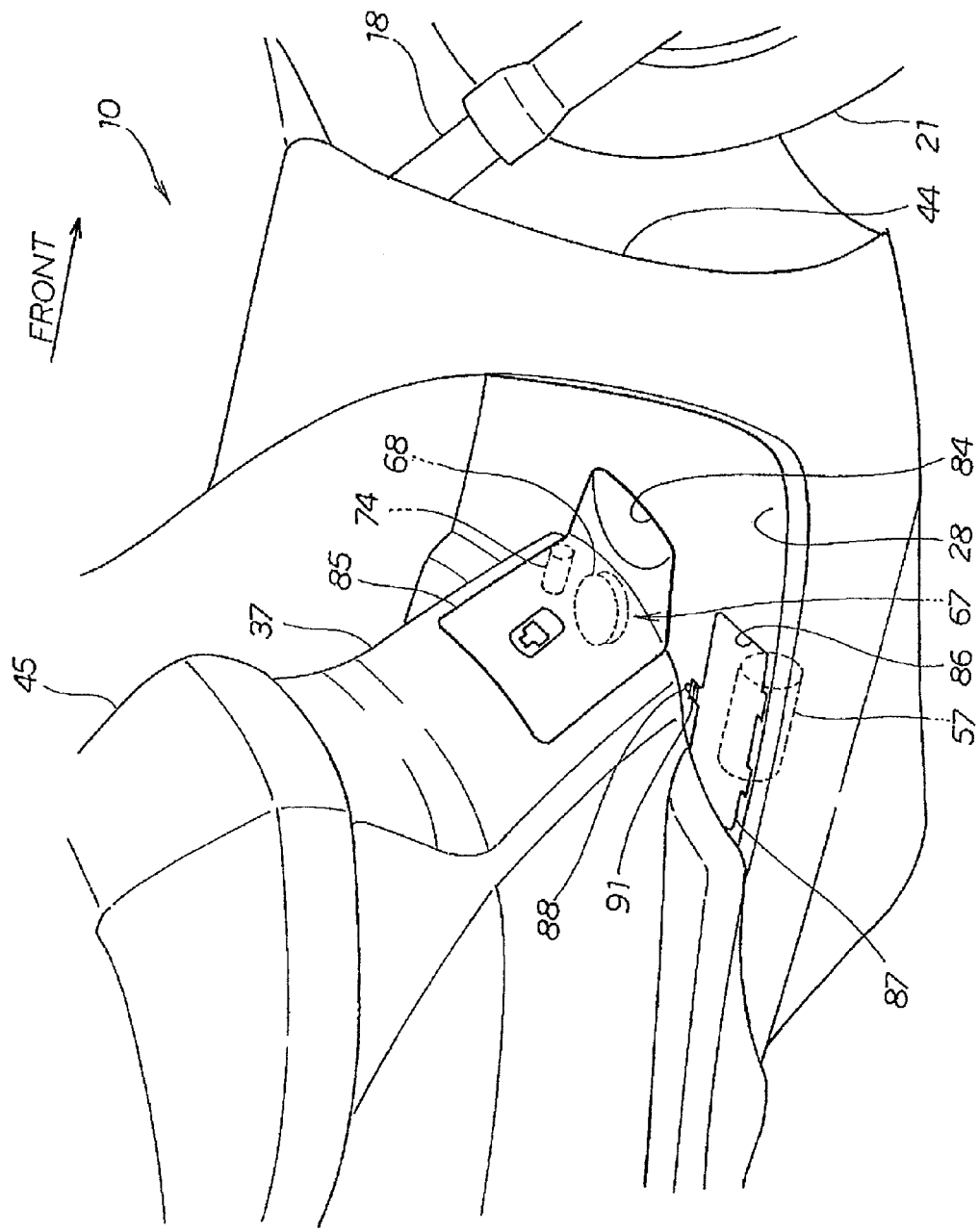
FIG. 5 is a perspective view of the scooter-type vehicle, illustrating an access hole.

Referring to FIG. 5, a seat-lower cover 37 is provided in a rear portion of the step floor 28 so as to rise upward from the step floor 28 to cover the seat 45 from below. An oil fill opening 84 used to feed oil to the fuel tank 32 is provided from the step floor 28 to the seat-lower cover 37. A fuel lid 85 opened and closed when fuel is fed into the filler neck 67 is provided at the oil fill opening 84.

The access hole 86 is provided in the step floor 28 above the fuel filter 57. Further, a lid 87 used to open and close the access hole 86 is provided in the step floor 28. The access hole 86 is provided with a dent 88. One's finger is put into the dent 88 and put on a step portion 91 of the lid 87 for opening and closing the lid 87.

A description is next given of the positional relationship between the fuel fill opening 84 and the fuel filter 57.

Figure 6:
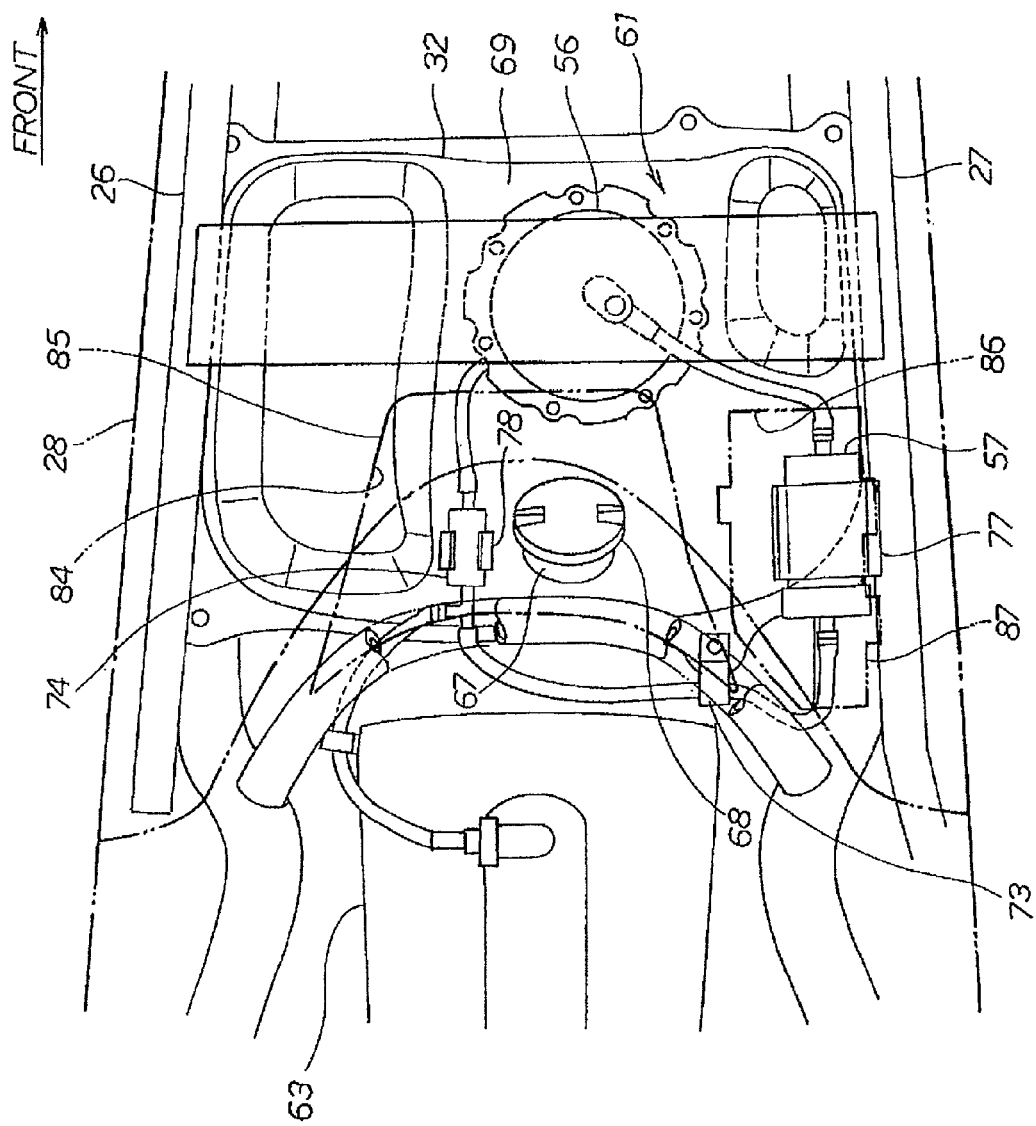
FIG. 6 is a plan view illustrating the positional relationship between the access hole and the fuel filter.

Referring to FIG. 6, the fuel fill opening 84 communicates with above the filler neck 67 and the pressure regulator 74. Since the pressure regulator 74 is located at a position corresponding to the fuel fill opening 84, it is possible to remove the fuel lid 85, put one's hand into the fuel fill opening 84 and attach and detach the pressure regulator 74. In this way, the fuel fill opening 84 for feeding fuel is used to attach and detach the pressure regulator 74. Therefore, it is not necessary to provide an additional opening for attaching and detaching the pressure regulator 74 and a lid used to close such an opening. Thus, the number of component parts can be reduced.

The access hole 86 communicates with the fuel filter 57. The access hole 86 needs only to be sized to enable the attachment and detachment of the fuel filter 86.

The fuel filter 57 is not supported by the filter support clip 77 by use of a tool or the like. Therefore, it is not necessary for the access hole 86 provided in the step floor 28 to open immediately above the fuel filter 57. It is only necessary for the access hole 86 to open from the vehicle-left portion of the fuel filter 57 to the front of the fuel fill opening 84 at minimum.

A description is next given of the opening and closing of the lid 87 of the access hole 86.

Figure 7:
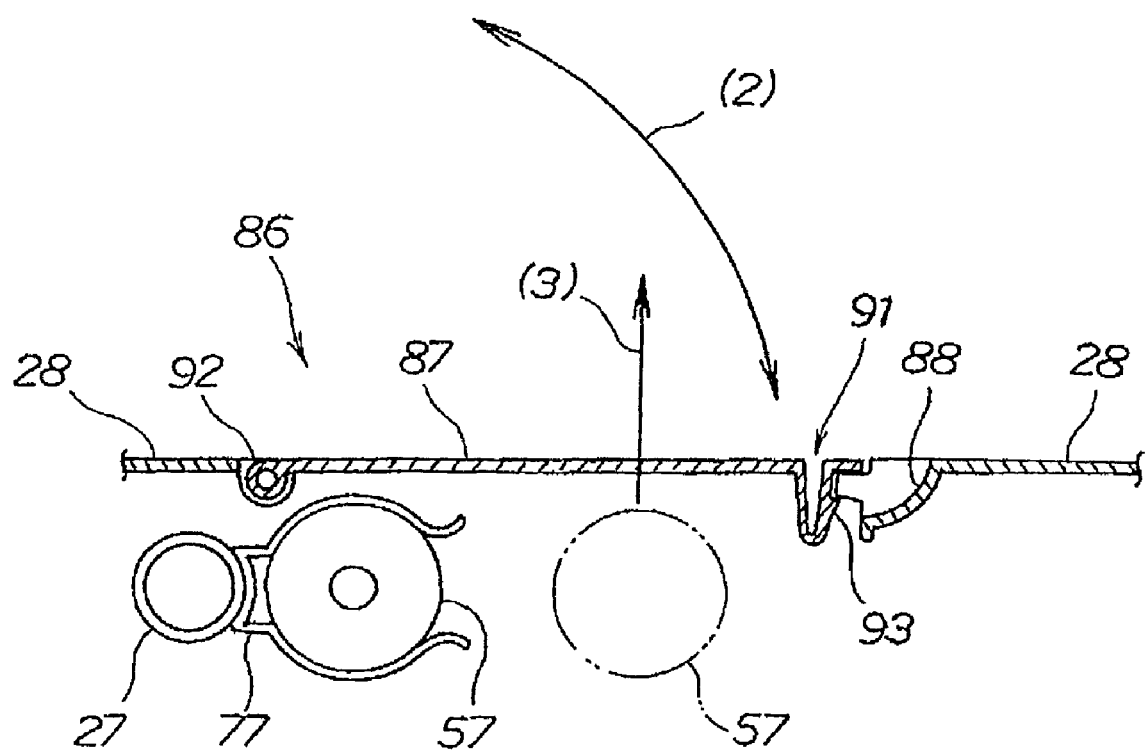
FIG. 7 is a view for assistance in explaining opening and closing of a lid of the access hole.

Referring to FIG. 7, the lid 87 used to open and close the access hole 86 is provided with a hinge 92. One's finger is put into the dent 88 for opening and closing the lid 87 as indicated with arrow (2). The step portion is provided with a claw 93. This claw 93 engages the step floor 28 to maintain the lid 87 in the closed state.

While the lid 87 is opened, the fuel filter 57 depicted with an imaginary line is taken out as indicated with arrow (3).

A description is given of a modification of FIG. 5.

Figure 8:
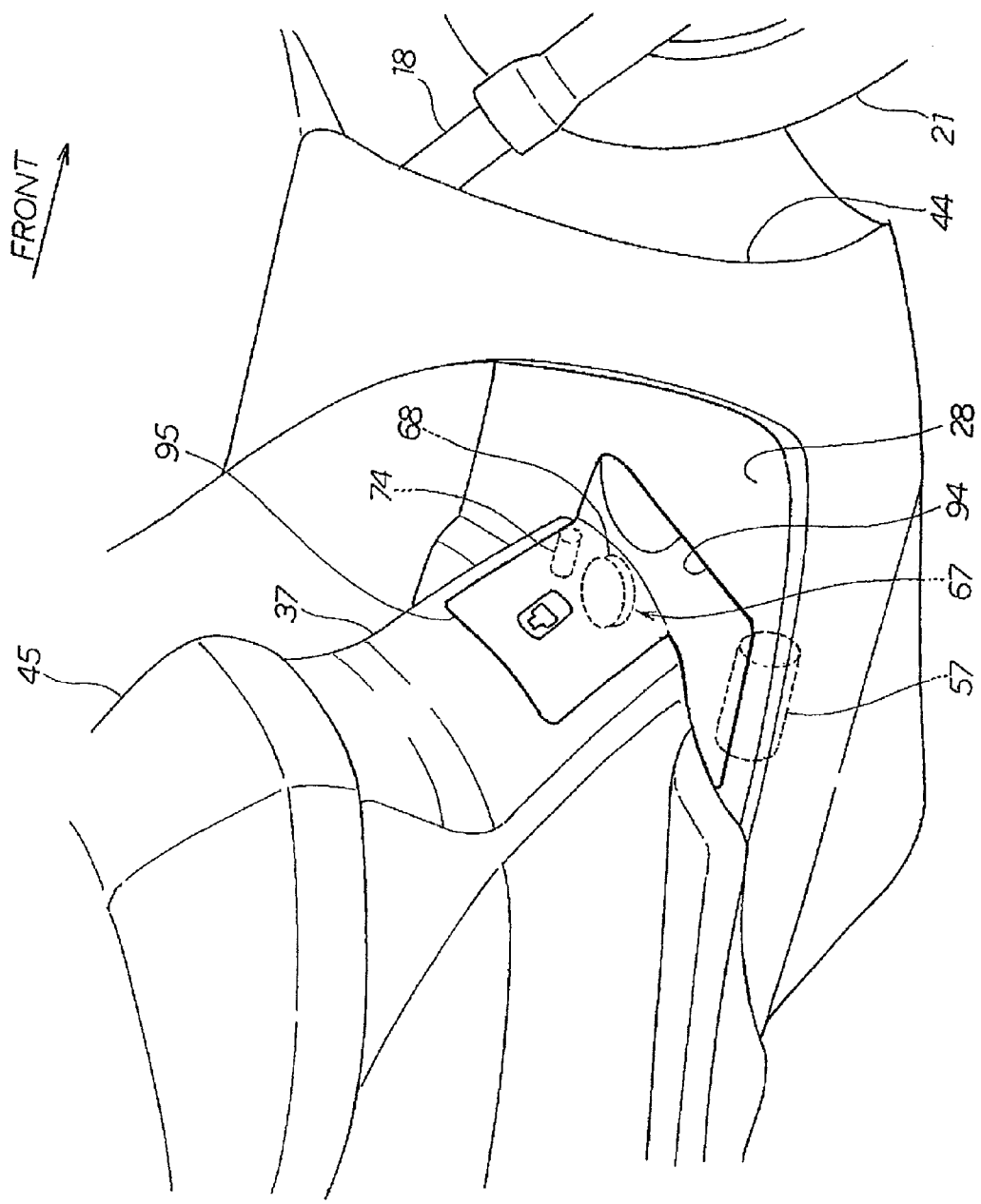
FIG. 8 is a view for assistance in explaining a modification of FIG. 5.

Referring to FIG. 8, an fuel fill opening 94 is provided from a portion of the step floor 28 above the fuel filter 57 to the seat-lower cover 37. A fuel lid 95 opened and closed when fuel is fed into the filler neck 67 is provided at this fuel fill opening 94.

A description is next given of the positional relationship between the fuel fill opening 94 and the fuel filter 57 in the modification.

Figure 9:
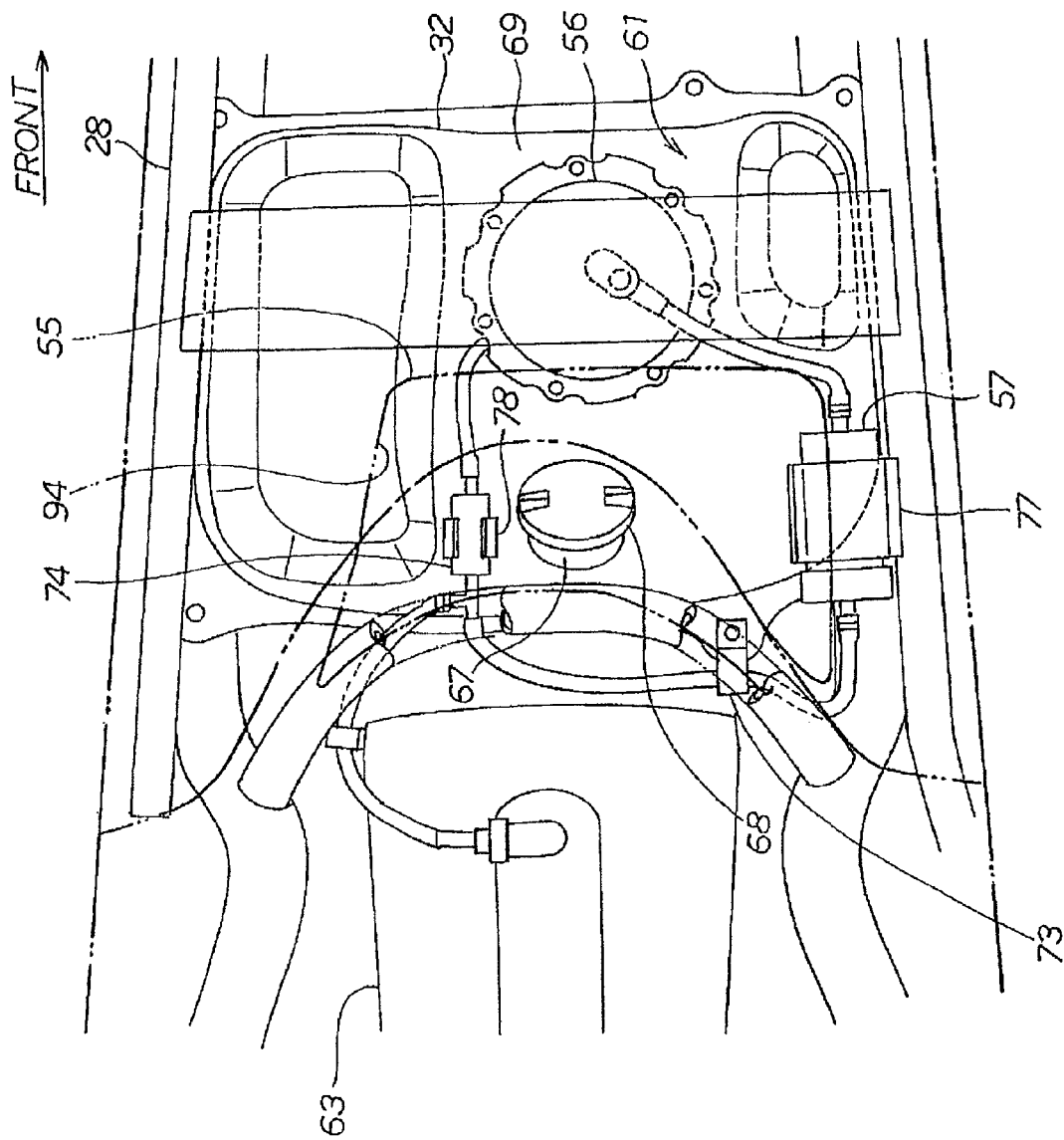
FIG. 9 is a plan view illustrating the positional relationship between an access hole and a fuel filter in the modification.

Referring to FIG. 9, the fuel fill opening 94 communicates with the filler neck 67 and the pressure regulator 74 and is located to communicate with a portion of the fuel filter 57. The removal of the fuel lid (reference numeral 95 in FIG. 8) makes it possible to feed fuel into the filler neck 67 and attach and detach the pressure regulator 74 and the fuel filter 57. Thus, the number of component parts can be reduced.

The fuel filter 57 is next described.

Figure 10:
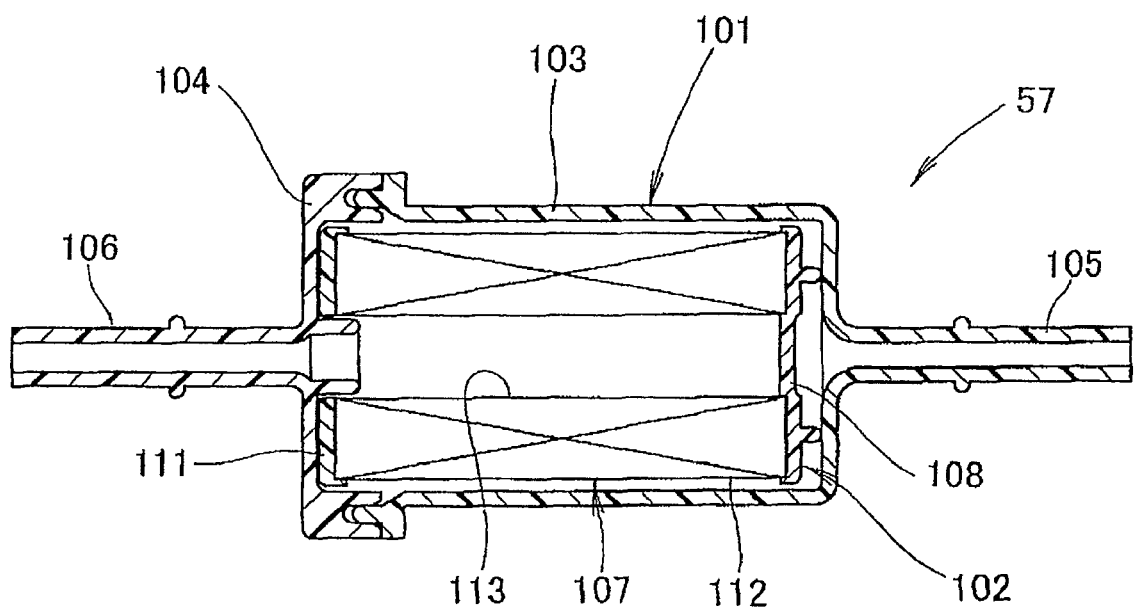
FIG. 10 is a cross-sectional view of the fuel filter.

Referring to FIG. 10, the fuel filter 57 includes a filter case 101 and a filter assembly 102 housed in the filter case 101.

The filter case 101 is composed of a bottomed cylindrical case body 103 and a case cover 104 covering an opening portion of the case body 103.

The case body 103 is provided with a fuel suction port 105 coupled to the fuel pipe (reference numeral 71 in FIG. 3) on the side of the fuel tank (reference numeral 32 in FIG. 3) to suck fuel. In addition, the case cover 104 is provided with a fuel discharge port 106 coupled to the fuel pipe (reference numeral 72 in FIG. 3) on the side of the injector (reference numeral 58 in FIG. 3) to discharge fuel.

The filter assembly 102 includes a cylindrical filter 107 made of filter-paper and frames 108 and 111 supporting both ends of the filter 107. The filter assembly 102 is fixedly put between the case body 103 and the case cover 104.

Fuel is sucked into the filter case 101 from the fuel suction port 105, passes through the filter 107 in such a manner as to flow from its outer circumferential surface 112 to its inner circumferential surface 113 for filtration, and is discharged from the fuel discharge port 106 to the outside of the filter case 101.

The pressure regulator 74 is next described.

Figure 11:
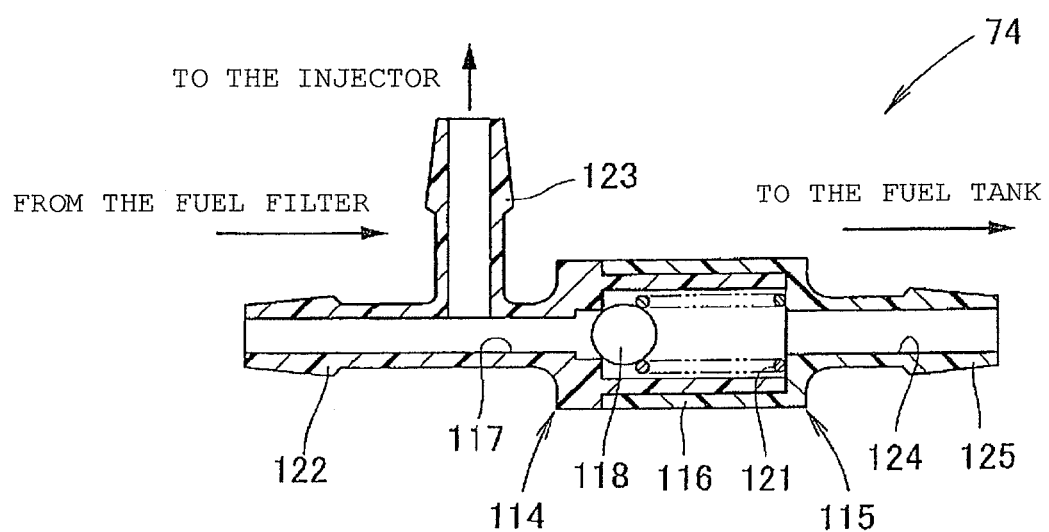
FIG. 11 is a cross-sectional view of a pressure regulator.

Referring to FIG. 11, the pressure regulator 74 includes a case 116 formed by joining a resin-made first case 114 to a resin-made second case 115; a steel-made spherical valve body 118 for opening and closing a through-hole 117 bored in a one end side bottom of the case 116; and a compression coil spring 121 for biasing the valve body 118 to close the through-hole 117. In addition, the pressure regulator 74 includes a fuel suction port 122 bored with the through-hole 117; a fuel discharge port 123 formed in an intermediate portion of the fuel suction port 122; and a fuel return port 125 bored with a through-hole 124 bored in the other end side bottom of the case 116.

The fuel suction port 122 is connected to the fuel filter (reference numeral 57 in FIG. 3). The fuel discharge port 123 is connected to the injector (reference numeral 58 in FIG. 3). The fuel return port 125 is connected to the fuel tank (reference numeral 32 in FIG. 3).

A second embodiment is now described. Incidentally, configurations identical to those illustrated in the first embodiment are denoted with like reference numerals and their detailed explanations are omitted.

Figure 12:
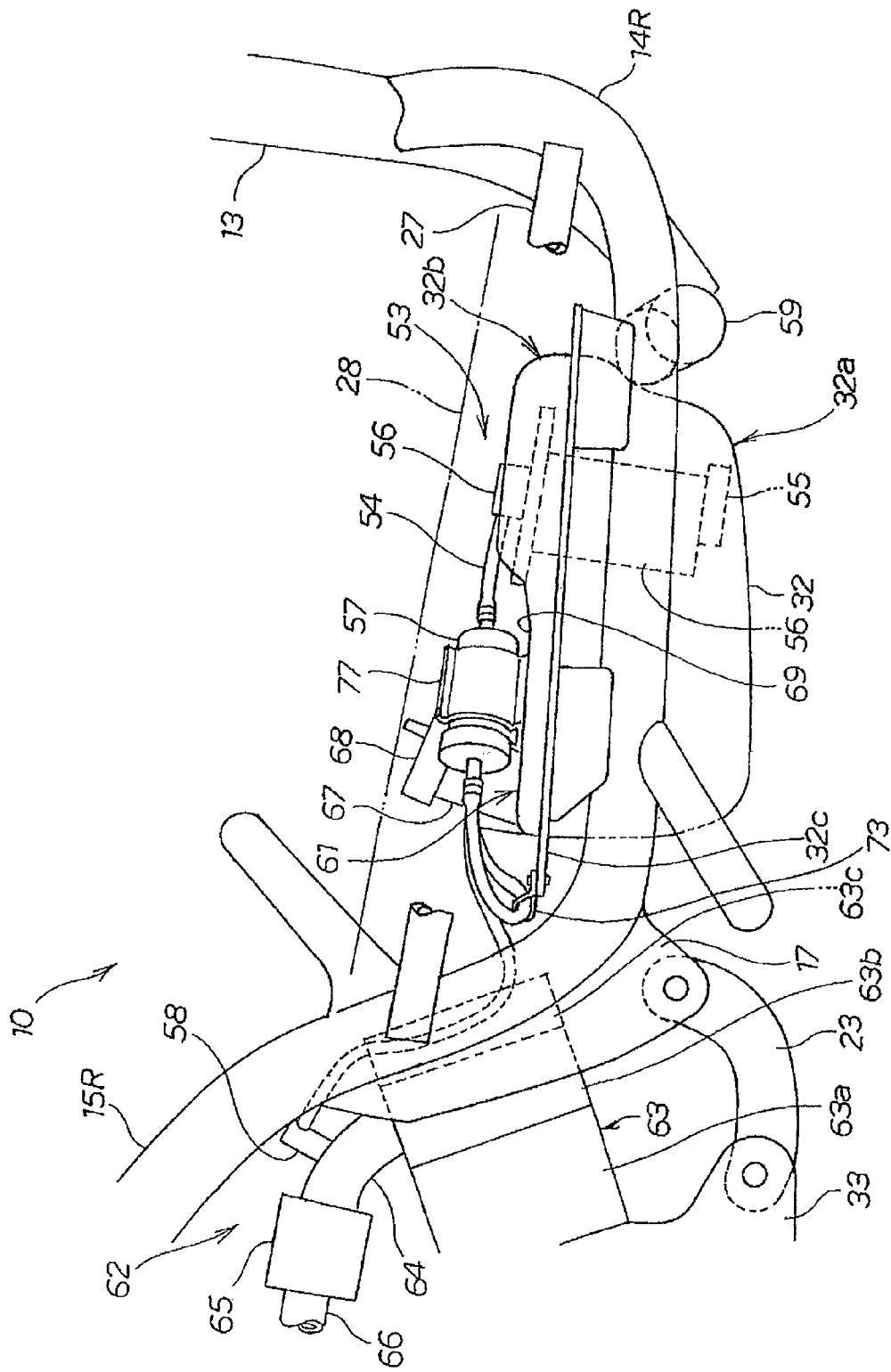
FIG. 12 is a lateral view of a fuel supply device according to a second embodiment.

Referring to FIG. 12, a fuel filter 57 is detachably attached to a filter support clip 77 provided on a recessed portion 69 of a fuel tank 32 in such a manner that its longitudinal direction runs along an upper surface 61 of the fuel tank 32. Since the fuel filter 57 is provided on the recessed portion 69 of the fuel tank 32, the position of the fuel filter 57 is lowered and in turn also the step floor 28 can be suppressed to a low level.

The filter support clip 77 is welded to the upper surface 61 of the fuel tank 32 so as to open upward. The fuel filter 57 can be attached and detached from above by a worker's hand. This facilitates replacement work.

A description is next given of arrangement of the fuel filter 57 as viewed from above.

Figure 13:
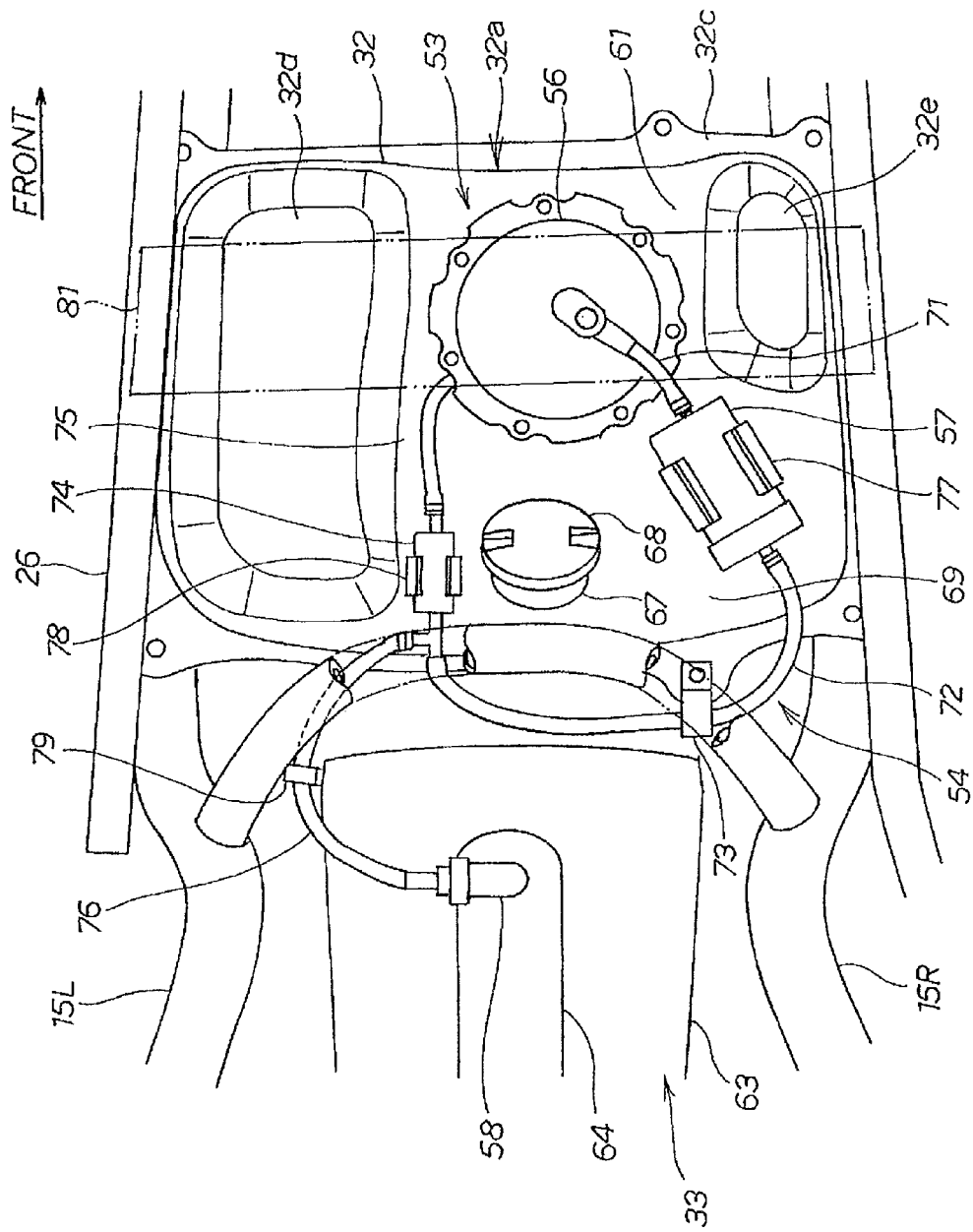
FIG. 13 is a plan view of an essential portion of the scooter-type vehicle.

Referring to FIG. 13, the fuel filter 57 is disposed on the recessed portion 69 of the fuel tank 32 in such a manner that its longitudinal direction faces the rearward and oblique outside of the vehicle. A fuel pump 56, the fuel filter 57, a pressure regulator 74 and an injector 58 are arranged in this order from the front of the vehicle. The fuel filter 57 and the pressure regulator 74 are disposed between the fuel pump 56 and the injector 58. Therefore, the distance of a fuel supply passage 54 from the fuel pump 56 to the fuel filter 57 can be prevented from being wastefully lengthened. Thus, the overall length of the fuel supply passage 54 from the fuel pump 56 to the injector 58 can be reduced.

The pressure regulator 74 and the fuel filter 57 are arranged on the upper surface 61 of the fuel tank 32. The fuel tank 32, the pressure regulator 74 and the fuel filter 57 are temporarily assembled and in this state these component parts are collectively assembled to the vehicle. Thus, the assembly work can be facilitated.

A fuel fill opening 84 is next described.

Figure 14:
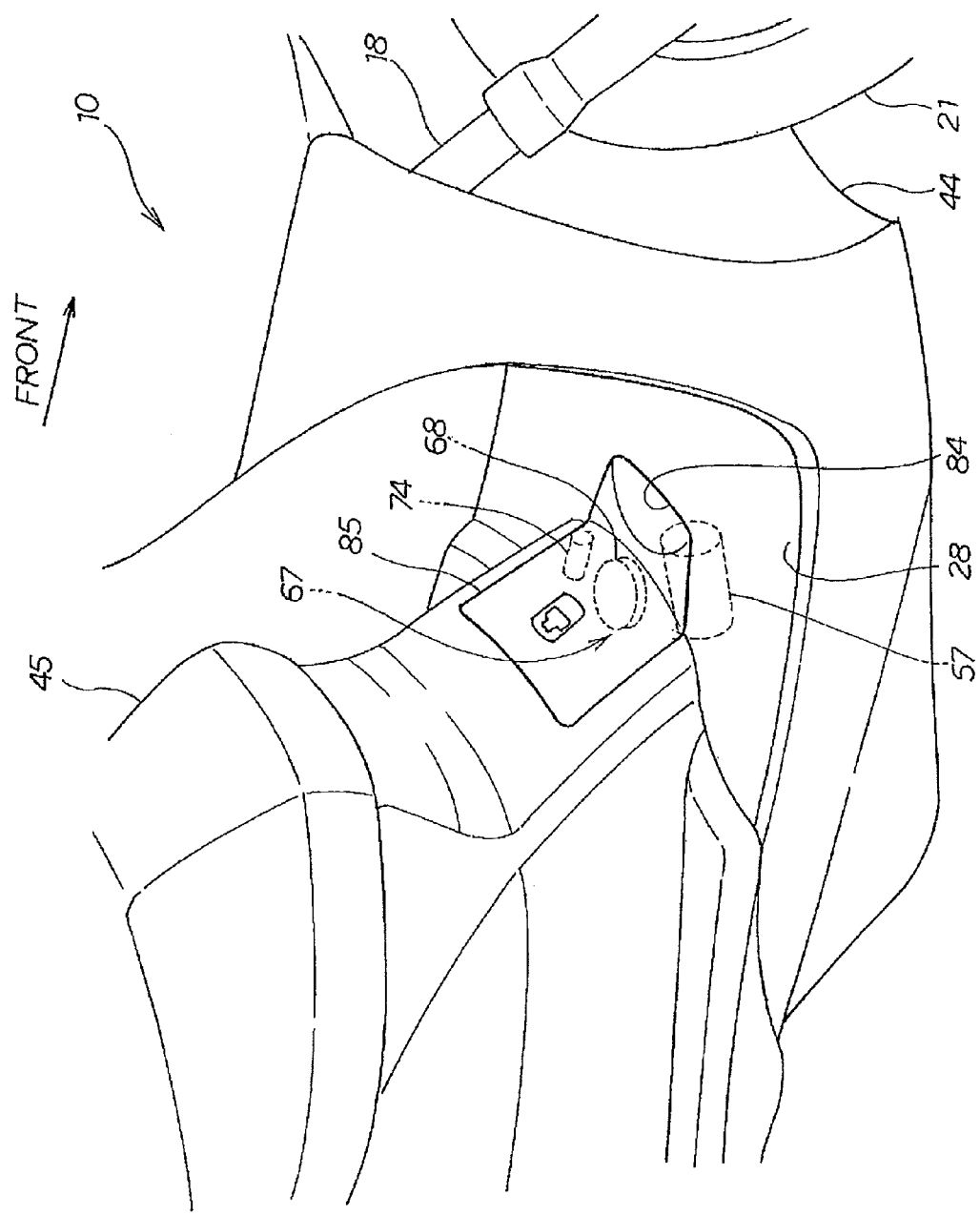
FIG. 14 is a perspective view of the scooter-type vehicle, illustrating an access hole.

Referring to FIG. 14, the fuel filter 57 and the pressure regulator 74 are disposed close to a filler neck 67. The fuel fill opening 84 is opened and closed by a fuel lid 85 used to feed fuel. Since the common fuel lid 85 can be diverted, component costs can be reduced.

A description is next given of the positional relationship between the oil fill opening 84 and the fuel filter 57.

Figure 15:
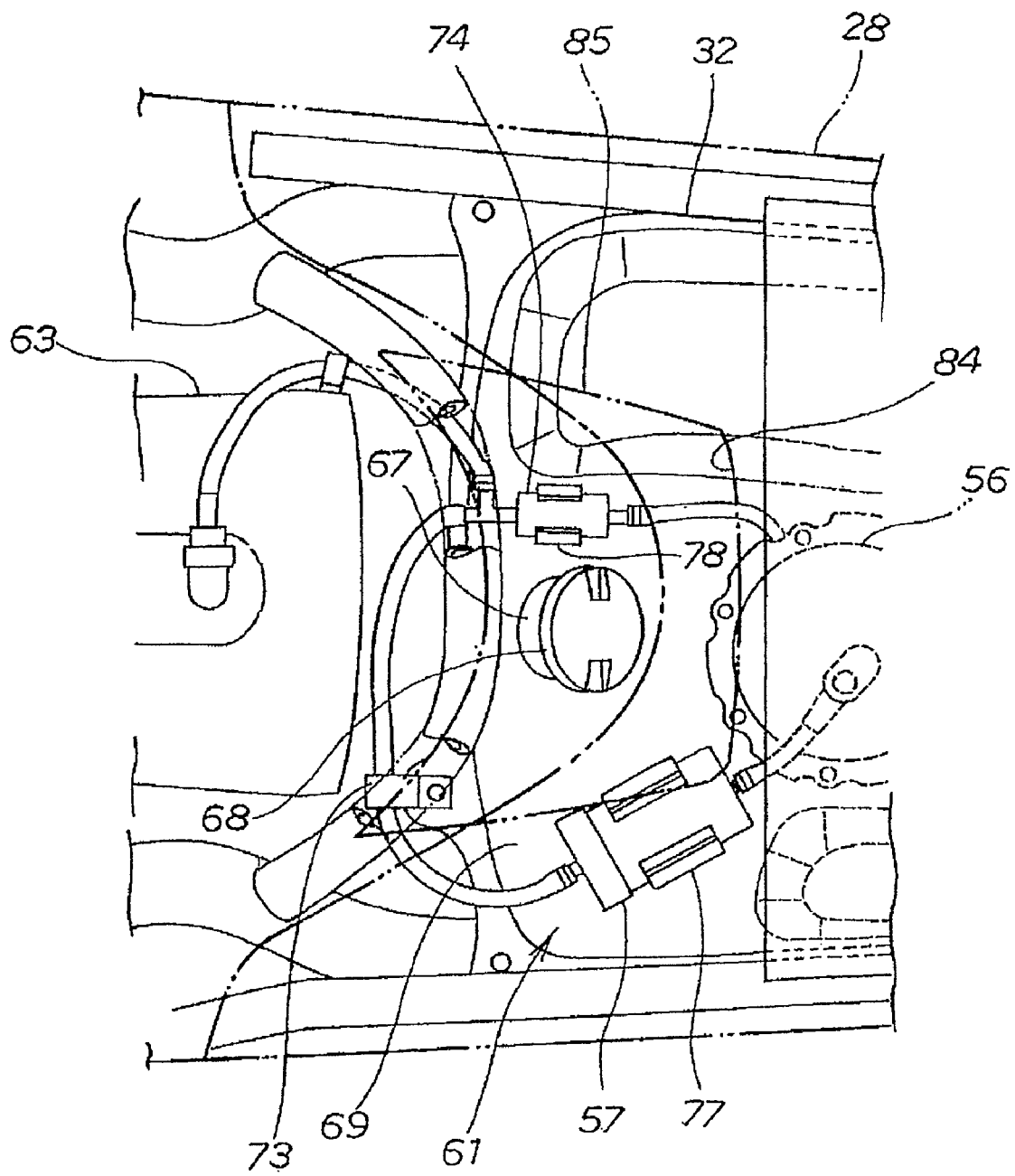
FIG. 15 is a plan view illustrating the positional relationship between the access hole and a fuel filter.

Referring to FIG. 15, the fuel fill opening 84 communicates with the filler neck 67, the pressure regulator 74 and a portion the fuel filter 57. The fuel filter 57 is partially located within the fuel fill opening 84. Fueling and replacement work for the fuel filter 57 and the pressure regulator 74 can be carried out by use of the single fuel fill opening 84, so that workability can be enhanced.

The pressure regulator 74 and the fuel filter 57 are dividedly arranged on the left and right, respectively, of the filler neck 67. Since the pressure regulator 74 and the fuel filter 57 are dividedly arranged on the left and right, attachment and detachment work for them can be performed by use of the oil fill opening 84 for the filler neck 67 provided on the step floor 28. Therefore, an opening and a lid are additionally not needed, so that an increase in the number of component parts can be prevented.

As illustrated in FIGS. 1, 2, 3, 12 and 13, in the scooter-type vehicle 10 including the body frame 11; the step floor 28 which is disposed between the front wheel 21 and the seat 45 and on which operator's feet are placed; the fuel tank 32 disposed below the step floor 28 and having the filler neck 67 projecting upward from the upper surface 61; the engine 33 swingably supported in the rear of the fuel tank 32 by the body frame 11; the fuel supply passage 54 for supplying the fuel in the fuel tank 32 toward the engine 33; and the fuel filter 57 disposed in an intermediate portion of the fuel supply passage 54 to purify fuel, the fuel filter 57 is disposed between the upper surface 61 of the fuel tank 32 and the step floor 28.

With this configuration, the size of the fuel filter 57 can freely be set without being restricted by the swing of the engine 33 located rearward of the fuel tank 32.

Additionally, since the filler neck 67 projecting from the upper surface 61 of the fuel tank 32 exists, between the fuel tank upper surface 61 and the step floor 28 tends to become a dead space. However, since the fuel filter 57 is disposed between the upper surface 61 of the fuel tank 32 and the step floor 28, the dead space defined between the upper surface 61 of the fuel tank 32 and the step floor 28 can effectively be utilized.

As illustrated in FIGS. 2, 3, 12 and 13, the recessed portion 69 is provided on the upper surface 61 of the fuel tank 32 and at least a portion of the fuel filter 57 is located within the recessed portion 69 as viewed from above the vehicle.

With this configuration, the recessed portion 69 is used to broaden the space that can be used for the arrangement of the fuel filter 57. Therefore, the large-size fuel filter 57 can be disposed.

Additionally, since the fuel filter 57 is stored in the recessed portion 69 of the fuel tank upper surface 61, the height up to the fuel filter 57 from the ground can be reduced. Consequently, the step floor 28 disposed above the fuel filter 57 can be lowered.

As illustrated in FIGS. 2 and 3, the body frame 11 includes the floor pipes 26 and 27 disposed below the step floor 28 and extending in the back and forth direction of the vehicle. The step floor 28 is disposed to extend along the floor pipes 26 and 27 as viewed from the side of the vehicle. The fuel filter 57 is disposed more inwardly of the vehicle than the floor pipes 26, 27, and detachably attached to the floor pipe 27 in such a manner that its longitudinal direction runs in the extending direction of the floor pipes 26 and 27.

With this configuration, the step floor 28 can be disposed as close to the floor pipes 26 and 27 as possible, so that the step floor 28 can be lowered.

Additionally, since the fuel filter 57 is located more inwardly of the vehicle than the floor pipes 26 and 27, the fuel filter 57 can externally be protected by the floor pipes 26 and 27.

As illustrated in FIGS. 12 and 13, the fuel filter 57 is detachably attached to the upper surface 61 of the fuel tank 32 in such a manner that its longitudinal direction runs along the upper surface 61 of the fuel tank 32.

With this configuration, in the state where the fuel filter 57 is temporarily assembled to the upper surface 61 of the fuel tank 32 (in the previously assembled state), these components parts are collectively assembled to the vehicle. Therefore, assembly work can be facilitated on a vehicle assembly line.

Since the step floor 28 can be disposed as close to the fuel tank 32 as possible, the step floor 28 can be lowered.

As illustrated in FIGS. 8, 9, 14 and 15, the seat-lower cover 37 is provided in the rear portion of the step floor 28 so as to rise upward from the step floor 28 to cover the seat 45 from below. The fuel fill opening 84 or 94 used to feed fuel to the fuel tank 32 is provided from the step floor 28 to the seat-lower cover 37. The fuel lid 85 or 95 opened and closed when fuel is fed into the filler neck 67 is provided at the fuel fill opening 84 or 94. The fuel filter 57 is disposed so as to be partially located within the fuel fill opening 84 or 94.

With this configuration, if the fuel lid 85 or 95 is opened, at least a portion of the fuel filter 57 is exposed. Therefore, attachment and detachment work for the fuel filter 57 can be performed using the fuel fill opening 84 or 94. Thus, the number of component parts can be reduced to reduce component costs.

As illustrated in FIGS. 2, 5, 6, 8, 9, and 12 to 15, the pump-anterior filter 55 for purifying the fuel in the fuel tank 32, the fuel pump 56 disposed on the downstream side of the pump-anterior filter 55, the fuel filter 57 disposed on the downstream side of the fuel pump 56, and the injector 58 for injecting fuel to the engine 33 are arranged on the fuel supply passage 54 in this order. The pressure regulator 74 for returning part of the fuel to the fuel tank 32 when fuel pressure between the fuel pump 56 and the injector 58 increases and reaches a predetermined pressure is disposed on the downstream side of the fuel filter 57. In addition, the pressure regulator 74 is disposed on the upper surface 61 of the fuel tank 32 in such a manner as to be at least partially located in the oil fill opening 84 or 94.

With this configuration, the pressure regulator 74 is disposed on the upper surface 61 of the fuel tank 32 in such a manner as to be at least partially located in the fuel fill opening 84 or 94. If the fuel lid 85 or 95 is opened, at least a portion of the pressure regulator 74 is exposed. Therefore, by using the fuel fill opening 84 or 94, the attachment and detachment work for the pressure regulator 74 can be performed along with the attachment and detachment work for the fuel filter 57.

As illustrated in FIGS. 2, 5, 8, 12 and 14, the fuel filter 57 has finer meshes than those of the pump-anterior filter 55. The pump-anterior filter 55 can capture large dust and the fuel filter 57 can capture fine dust that has passed through the pump-anterior filter 55. Since the fuel filter 57 does not capture large dust, it is hard to be clogged, which can reduce its replacement frequency. Additionally, since the pump-anterior filter 55 has the coarse meshes, it is hard to be clogged. Thus, the pump-anterior filter 55 can be prevented from serving as resistance against the fuel pump 56, so that the inexpensive fuel pump 56 can be employed.

Consequently, the replacement cycle of both the pump-anterior filter 55 and the fuel filter 57 can be lengthened and the frequency of maintenance can be reduced. In addition, an amount of fuel passing through the pump-anterior filter 55 and the fuel filter 57 can satisfactorily be maintained for a long period of time. Even if a fuel flow rate to be needed increases suddenly, the pump-anterior filter 55 and the fuel filter 57 can sufficiently deal with such an event.

Since the fuel filter 57 has fine meshes, it can capture fine dust even in the case of using fuel with fine dust such as ethanol. On the other hand, the fuel filter 57 has finer meshes than those of the pump-anterior filter 55 in order to make it possible to use even fuel with fine dust such as ethanol. Therefore, the fuel filter 57 becomes shorter in replacement cycle than the pump-anterior filter 55. However, the attachment and detachment work for the fuel filter 57 can be done only by opening the fuel lid 85 or 89, which facilitates the replacement work.

As illustrated in FIGS. 1 and 12, the fuel filter 57 is disposed at a position lower than the injector 58 in the vertical direction of the vehicle. Therefore, in the case where the vehicle is parked for a long period of time, it is possible to prevent fuel from leaking from the injector 58 due to the weight of the fuel staying in the fuel filter 57.

Incidentally, it is reasonable that the present embodiment is applied to not only the scooter-type vehicle 10 on which the engine runs on gasoline is mounted but also the scooter-type vehicle 10 on which the engine 33 runs on bio-fuel such as ethanol or the like is mounted, provided that such fuel can be purified by the fuel filter 57.

The embodiments are suitable for scooter-type vehicles provided with a fuel filter on the outside of a fuel tank.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A scooter-type vehicle, comprising:
   a body frame;
   a step floor provided between a front wheel and a seat;
   a fuel tank disposed below said step floor and having a filler neck projecting upwardly from an upper surface of said fuel tank;
   an engine swingably supported by said body frame behind said fuel tank;
   a fuel supply passage for supplying fuel from said fuel tank to said engine; and
   a fuel filter disposed in an intermediate portion of said fuel supply passage and provided to purify the fuel,
   wherein said fuel filter is disposed between said upper surface of said fuel tank and said step floor,
   wherein said body frame includes a floor pipe located below said step floor and extending in a front-to-rear direction of the vehicle;
   wherein said step floor is disposed along said floor pipe, as viewed from the side of the vehicle; and
   wherein said fuel filter is disposed more inward of the vehicle than said floor pipe and is detachably attached to said floor pipe in such a manner that a longitudinal direction of said fuel filter runs along an extending direction of said floor pipe.

2. The scooter-type vehicle according to claim 1,
   wherein said fuel tank includes a recessed portion on said upper surface of said fuel tank, and
   wherein at least a portion of said fuel filter is located in said recessed portion, as viewed from above the vehicle.

3. The scooter-type vehicle according to claim 2, wherein said fuel filter is detachably attached to said upper surface of said fuel tank in such a manner that the longitudinal direction of said fuel filter runs along said upper surface of said fuel tank.

4. The scooter-type vehicle according to claim 3, further comprising:
   a seat-lower cover provided in a rear portion of said step floor so as to rise upwardly from said step floor to cover said seat from below;
   a fuel fill opening provided from said step floor to said seat-lower cover to feed fuel to said fuel tank; and
   a fuel lid provided at said fuel fill opening so as to be opened and closed when fuel is supplied to said fuel fill opening;
   wherein said fuel filter is disposed such that at least a portion of said fuel filter is located within said fuel fill opening, as viewed from above the vehicle; and
   wherein said fuel filter can be attached and detached through said fuel fill opening.

5. The scooter-type vehicle according to claim 4,
wherein a pump-anterior filter for purifying fuel in said fuel tank, a fuel pump disposed on a downstream side of said pump-anterior filter, said fuel filter disposed on the downstream side of said fuel pump, and an injector for injecting fuel toward said engine are arranged on said fuel supply passage in this order;
wherein a pressure regulator for returning fuel to said fuel tank when fuel pressure between said fuel pump and said injector increases and reaches a predetermined pressure is disposed on the downstream side of said fuel filter, and
wherein said pressure regulator is disposed on said upper surface of said fuel tank such that at least a portion of said pressure regulator is located in said fuel fill opening, as viewed from above the vehicle, such that said pressure regulator can be attached and detached through said fuel fill opening.

6. The scooter-type vehicle according to claim 2, further comprising:
a seat-lower cover provided in a rear portion of said step floor so as to rise upwardly from said step floor to cover said seat from below;
a fuel fill opening provided from said step floor to said seat-lower cover to feed fuel to said fuel tank; and
a fuel lid provided at said fuel fill opening so as to be opened and closed when fuel is supplied to said fuel fill opening;
wherein said fuel filter is disposed such that at least a portion of said fuel filter is located within said fuel fill opening, as viewed from above the vehicle; and
wherein said fuel filter can be attached and detached through said fuel fill opening.

7. The scooter-type vehicle according to claim 6,
wherein a pump-anterior filter for purifying fuel in said fuel tank, a fuel pump disposed on a downstream side of said pump-anterior filter, said fuel filter disposed on the downstream side of said fuel pump, and an injector for injecting fuel toward said engine are arranged on said fuel supply passage in this order;
wherein a pressure regulator for returning fuel to said fuel tank when fuel pressure between said fuel pump and said injector increases and reaches a predetermined pressure is disposed on the downstream side of said fuel filter, and
wherein said pressure regulator is disposed on said upper surface of said fuel tank such that at least a portion of said pressure regulator is located in said fuel fill opening, as viewed from above the vehicle, such that said pressure regulator can be attached and detached through said fuel fill opening.

8. The scooter-type vehicle according to claim 6, wherein said fuel filter has finer meshes than meshes of said pump-anterior filter.

9. The scooter-type vehicle according to claim 6, wherein said fuel filter is disposed at a position lower than said injector, in a vertical direction of the vehicle.

10. The scooter-type vehicle according to claim 1, wherein said fuel filter is detachably attached to said upper surface of said fuel tank in such a manner that the longitudinal direction of said fuel filter runs along said upper surface of said fuel tank.

11. The scooter-type vehicle according to claim 10, further comprising:
a seat-lower cover provided in a rear portion of said step floor so as to rise upwardly from said step floor to cover said seat from below;
a fuel fill opening provided from said step floor to said seat-lower cover to feed fuel to said fuel tank; and
a fuel lid provided at said fuel fill opening so as to be opened and closed when fuel is supplied to said fuel fill opening;
wherein said fuel filter is disposed such that at least a portion of said fuel filter is located within said fuel fill opening, as viewed from above the vehicle; and
wherein said fuel filter can be attached and detached through said fuel fill opening.

12. The scooter-type vehicle according to claim 11,
wherein a pump-anterior filter for purifying fuel in said fuel tank, a fuel pump disposed on a downstream side of said pump-anterior filter, said fuel filter disposed on the downstream side of said fuel pump, and an injector for injecting fuel toward said engine are arranged on said fuel supply passage in this order;
wherein a pressure regulator for returning fuel to said fuel tank when fuel pressure between said fuel pump and said injector increases and reaches a predetermined pressure is disposed on the downstream side of said fuel filter, and
wherein said pressure regulator is disposed on said upper surface of said fuel tank such that at least a portion of said pressure regulator is located in said fuel fill opening, as viewed from above the vehicle, such that said pressure regulator can be attached and detached through said fuel fill opening.

13. The scooter-type vehicle according to claim 11, wherein said fuel filter has finer meshes than meshes of said pump-anterior filter.

14. The scooter-type vehicle according to claim 11, wherein said fuel filter is disposed at a position lower than said injector, in a vertical direction of the vehicle.

15. The scooter-type vehicle according to claim 1, further comprising:
a seat-lower cover provided in a rear portion of said step floor so as to rise upwardly from said step floor to cover said seat from below;
a fuel fill opening provided from said step floor to said seat-lower cover to feed fuel to said fuel tank; and
a fuel lid provided at said fuel fill opening so as to be opened and closed when fuel is supplied to said fuel fill opening;
wherein said fuel filter is disposed such that at least a portion of said fuel filter is located within said fuel fill opening, as viewed from above the vehicle; and
wherein said fuel filter can be attached and detached through said fuel fill opening.

16. The scooter-type vehicle according to claim 15,
wherein a pump-anterior filter for purifying fuel in said fuel tank, a fuel pump disposed on a downstream side of said pump-anterior filter, said fuel filter disposed on the downstream side of said fuel pump, and an injector for injecting fuel toward said engine are arranged on said fuel supply passage in this order;
wherein a pressure regulator for returning fuel to said fuel tank when fuel pressure between said fuel pump and said injector increases and reaches a predetermined pressure is disposed on the downstream side of said fuel filter, and
wherein said pressure regulator is disposed on said upper surface of said fuel tank such that at least a portion of said pressure regulator is located in said fuel fill opening, as viewed from above the vehicle, such that said pressure regulator can be attached and detached through said fuel fill opening.

17. The scooter-type vehicle according to claim 15, wherein said fuel filter has finer meshes than meshes of said pump-anterior filter.

18. The scooter-type vehicle according to claim 15, wherein said fuel filter is disposed at a position lower than said injector, in a vertical direction of the vehicle.

* * * * *